United States Patent
Rizwan et al.

(10) Patent No.: US 12,284,072 B2
(45) Date of Patent: Apr. 22, 2025

(54) APPARATUS AND METHOD FOR IDENTIFYING DEVICE COMMUNICATION FAILURES IN COMMUNICATION NETWORKS

(71) Applicant: Honeywell International Inc., Charlotte, NC (US)

(72) Inventors: Mohammed Rizwan, Bengaluru (IN); Sameer Gupta, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 438 days.

(21) Appl. No.: 17/743,756

(22) Filed: May 13, 2022

(65) Prior Publication Data

US 2023/0370325 A1    Nov. 16, 2023

(51) Int. Cl.
*H04L 41/0631* (2022.01)
*H04L 43/04* (2022.01)
*H04L 43/0829* (2022.01)
*H04L 43/16* (2022.01)

(52) U.S. Cl.
CPC .......... *H04L 41/0645* (2013.01); *H04L 43/04* (2013.01); *H04L 43/0841* (2013.01); *H04L 43/16* (2013.01)

(58) Field of Classification Search
CPC . H04L 41/0645; H04L 43/04; H04L 43/0841; H04L 43/16; H04L 41/064; H04L 43/02; H04L 43/0852; H04L 43/0829; H04L 41/0631; H04L 41/0677
See application file for complete search history.

(56) References Cited

U.S. PATENT DOCUMENTS

| | | | |
|---|---|---|---|
| 6,173,207 B1* | 1/2001 | Eidson | G05B 19/4185 702/187 |
| 10,116,523 B1 | 10/2018 | Diancin et al. | |
| 10,139,788 B2 | 11/2018 | Dutta et al. | |
| 2003/0074374 A1* | 4/2003 | Karibe | H04N 21/6587 |
| 2003/0145081 A1* | 7/2003 | Lau | H04L 43/00 709/224 |
| 2005/0249124 A1* | 11/2005 | Elie-Dit-Cosaque | H04L 43/10 370/242 |
| 2007/0230360 A1* | 10/2007 | Nishi | H04L 43/10 370/402 |
| 2007/0294591 A1 | 12/2007 | Usynin et al. | |

(Continued)

OTHER PUBLICATIONS

Youngjoon Won et al, An Approach for Failure Recognition in IP-based Industrial Control Networks And Systems, International Journal of Network Management, Nov. 2012, 22(6): 447-493, DOI: 10.1002/mem.1804.

*Primary Examiner* — Hoang-Chuong Q Vu
(74) *Attorney, Agent, or Firm* — Paschall & Associates, LLC; James C. Paschall; Anthony Miologos

(57) ABSTRACT

An apparatus and method is disclosed for identifying the root cause of device communication failures in a communication network comprising collecting communication data transmitted and received on the communication network from a controller and one or more devices operably connected to the communication network and analyzing the collected communication data to diagnose if communication data is local looping or has been lost between the controller and the one or more devices and the location of the fault in the communication network.

12 Claims, 5 Drawing Sheets

(56) References Cited

U.S. PATENT DOCUMENTS

| | | | |
|---|---|---|---|
| 2008/0301101 A1* | 12/2008 | Baratto | G06F 9/451 |
| 2010/0023994 A1* | 1/2010 | Taylor | H04N 21/44231 |
| | | | 725/148 |
| 2012/0290727 A1* | 11/2012 | Tivig | H04L 69/163 |
| | | | 709/227 |
| 2013/0176857 A1* | 7/2013 | Turner | H04M 3/30 |
| | | | 370/241 |
| 2013/0231904 A1 | 9/2013 | Jones | |
| 2016/0352601 A1* | 12/2016 | Zhang | H04L 43/0829 |
| 2018/0132174 A1* | 5/2018 | Strong | H04L 45/00 |
| 2019/0364302 A1* | 11/2019 | Perlman | H04N 19/436 |
| 2021/0409271 A1* | 12/2021 | Jacob Da Silva | H04L 41/0866 |
| 2022/0045983 A1* | 2/2022 | Carter | H04L 12/2829 |
| 2023/0013462 A1* | 1/2023 | Woldahl | H04L 43/10 |

* cited by examiner

APPARATUS AND METHOD FOR IDENTIFYING DEVICE COMMUNICATION FAILURES IN COMMUNICATION NETWORKS

TECHNICAL FIELD

This disclosure is generally directed to industrial process control and automation systems. More specifically, this disclosure is directed to an apparatus and method for identify-mg the root cause of device communication failures in communication networks.

BACKGROUND

Modern industrial process control and automation systems are typically equipped with a considerable number of field devices which monitor and control the manufacture process during the operation of a manufacturing plant. For example, field devices monitor signals such as temperatures and pressure and a variety of software performance metrics relating to the process being controlled by the industrial process control and automation system. Signals provided by the field devices are used by various process controllers of the automation system to control actuators to adjust various process parameters to control the manufacturing process. Industrial process control and automation systems use managed Ethernet based industrial networks to communicate control and data signals between field devices and controllers of the automation system. The managed industrial Ethernet networks are connected in various network topologies, such as for example, DLR ring and Linear/Star Ethernet networks and may use various data communication protocols, such as for example, an EtherNet/IP and or a Profinet protocol to manage communications between the field devices and the controllers.

There are no currently known method that can detect and pinpoint the root causes of a communication failure in such networks caused by mis-connected wiring, connector/extender shorting, and the formation of unsupported local network loops caused by prohibited loop connections. There is a need in industry for a pro-active mechanism that can detect and diagnose network instabilities such as for example network instability or network failures due to a controller issues, a device issues or network issues and arrive at the root cause of the instability and failure.

SUMMARY

This disclosure relates to an apparatus and method for identifying the root cause of device communication failures in communication networks.

In a first embodiment, an apparatus is disclosed comprising a communication network operably connected to one or more devices, a memory, and one or more processing devices operably connected to the memory and the communication network. The one or more processing devices are configured to collect communication data transmitted and received on the communication network from the one more devices and record the communication data in the memory. The processing devices further configured to analyze the collected communication data stored in the memory to diagnose if communication data is local looping or has been lost between the one or more devices.

In a second embodiment, a method is disclosed comprising collecting communication data transmitted and received on a communication network from a controller and one or more devices operably connected to the communication network and analyzing the collected communication data to diagnose if communication data has been local looping or has been lost between the controller and the one or more devices.

In third embodiment, a non-transitory machine-readable medium encoded with executable instructions is disclosed that when executed, cause one or more processors to collect communication data from data packets transmitted and received on a communication network from a controller and one or more devices operably connected to the communication network and to analyze the collected communication data to diagnose if communication data has been local looping or has been lost between the controller and the one or more devices.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
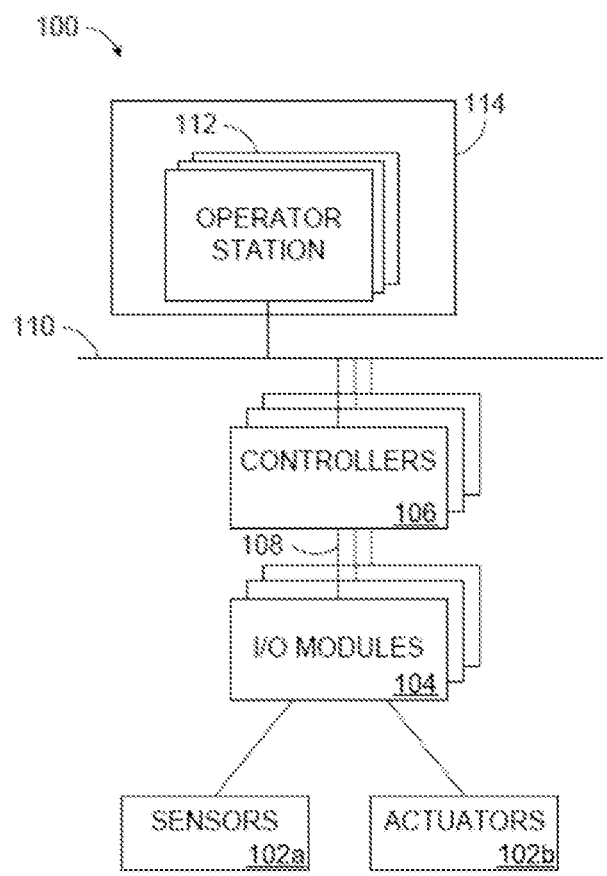
FIG. 1 illustrates an example industrial control and automation system according to this disclosure.

FIG. 1 illustrates a portion of an example industrial process control and automation system 100 according to this disclosure. As shown in FIG. 1, the system 100 includes various components that facilitate production or processing of at least one product or other material. For instance, the system 100 can be used to facilitate control or monitoring of components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials or energy in different forms in some manner.

In the example shown in FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one input/output (I/O) module 104 is coupled to the sensors 102a and actuators 102b. The I/O modules 104 facilitate interaction with the sensors 102a, actuators 102b, or other field devices. For example, an I/O module 104 could be used to receive one or more analog inputs (AIs), digital inputs (DIs), digital input sequences of events (DISOEs), or pulse accumulator inputs (PIs) or to provide one or more analog outputs (AOs) or digital outputs (DOs). Each I/O module 104 includes any suitable structure(s) for receiving one or more input signals from or providing one or more output signals to one or more field devices. Depending on the implementation, an I/O module 104 could include fixed number(s) and type(s) of inputs or outputs or reconfigurable inputs or outputs. In the exemplary system of FIG. 1 I/O modules 104 are connected to controllers 106 via network 108. The controllers 106 serve as an entry and exit point for a device node. Control information as well as data must pass through or communicate with the controller 106 prior to being routed from the node. For example, control information from a controller 106 can be sent to one or more actuators 102a associated with the controllers 106 device node. Data from the sensors 102a is communicated to one or more controllers 106 associated with the device node.

For example, a first set of controllers 106 may use measurements from one or more sensors 102a to control the operation of one or more actuators 102b. These controllers 106 could interact with the sensors 102a, actuators 102b, and other field devices via the I/O module(s) 104. The controllers 106 may be coupled to the I/O module(s) 104 via Ethernet, backplane communications, serial communications, or the like. A second set of controllers 106 could be used to optimize the control logic or other operations performed by the first set of controllers. A third set of controllers 106 could be used to perform additional functions.

The controllers 106 can be used in the system 100 to perform various functions in order to control one or more industrial processes. For example, a first set of controllers 106, that operate as a first network node may use measurements from one or more sensors 102b sent from controllers 106 operating as a second and separated network node to control the operation of one or more actuators 102b. These controllers 106 could interact with the sensors 102a, actuators 102b, and other devices singularly or via I/O module(s) 104.

The controllers 106 may be coupled to the I/O module(s) 104 via an Ethernet network 108 using various network topologies, such as for example, a device level ring (DLR) topology, a linear bus (LINEAR) topology or star topology (STAR) or any combination of DLR, STAR or LINEAR or the like. A second set of controllers 106 could be used to optimize the control logic or other operations performed by the first set of controllers within a network node. A third set of controllers 106 could be used to perform additional functions.

The Ethernet network 108 may use a managed industrial Ethernet application layer for industrial automation, such as for example, an Ethernet industrial (EtherNet/IP) protocol or a process field net (Profinet) protocol to communicate between the controller and devices connected to the Ethernet network 108. Such managed industrial Ethernet application layers use all the transport and control protocols used in a traditional Ethernet system including the Transport Control Protocol (TCP), the user datagram protocol (UDP), the internet protocol (IP) and the media access and signaling technologies found in off-the-shelf Ethernet interfaces and devices. It allows the user to address a broad spectrum of process control needs using a single technology. EtherNet/IP is currently managed by the Open DeviceNet Vendors Association (ODVA) and Profinet by the Profibus international organization.

Both the managed Ethernet protocols either the EtherNet/IP protocol or Profinet protocol use a comprehensive suite of messages and services for a variety of manufacturing automation applications, including control, safety, synchronization, motion, configuration, and information. Controllers 106 and compatible Ethernet devices installed on an EtherNet/IP network can communicate with other EtherNet/IP compliant devices connected on an EtherNet/IP network. Profinet compliant devices connected on Profinet network can communicate with other Profinet compliant devices connected on the Profinet network. Data accessed from devices connected to a managed industrial ethernet protocol (reads and writes) can be used for control and data collection.

Controllers 106 are often arranged hierarchically in a system. For example, different controllers 106 could be used to control individual actuators, collections of actuators forming machines, collections of machines forming units, collections of units forming plants, and collections of plants forming an enterprise, either directly connected in their network node or to a different network node via a controller 106. A particular example of a hierarchical arrangement of controllers 106 is defined as the "Purdue" model of process control. The controllers 106 in different hierarchical levels can communicate via one or more Ethernet networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control (MPC) or other advanced predictive control. As a particular example, each controller 106 could represent a computing device running a real-time operating system, a MICROSOFT WINDOWS operating system, or other operating system. Operator access to and interaction with the controllers 106 and other components of the system 100 can occur via various operator stations 112 coupled to controllers 106 via network 110. An operator station 112 can be located in a control room 114 that controls the plant or enterprise or may be coupled or assigned locally to a controller 106 that could receive and display warnings, alerts, or other messages or displays generated by a particular controller 106 or set of controllers.

Each operator station 112 could be used to provide information to an operator and receive information from an operator. For example, each operator station 112 could provide information identifying a current state of an industrial process to an operator, such as values of various process variables and warnings, alarms, or other states associated with the industrial process. Each operator station 112 could also receive information affecting how the industrial process is controlled, such as by receiving setpoints for process variables controlled by the controllers 106 or other information that alters or affects how the controllers 106 control the industrial process. Each operator station 112 includes any suitable structure for displaying information to and interacting with an operator. Each of the operator stations could, for example, represent a computing device running a MICROSOFT WINDOWS operating system.

This represents a brief description of one type of industrial process control and automation system that may be used to manufacture or process one or more materials. Additional details regarding industrial process control and automation systems are well-known in the art and are not needed for an understanding of this disclosure. Also, industrial process control and automation systems are highly configurable and can be configured in any suitable manner according to particular needs.

Although FIG. 1 illustrates a portion of one example industrial process control and automation system 100, various changes may be made to FIG. 1. For example, various components in FIG. 1 could be combined, further subdivided, rearranged, or omitted and additional components could be added according to particular needs. Also, while FIG. 1 illustrates one example operational environment in which redundant controllers could be used, this functionality could be used in any other suitable system.

Figure 2:
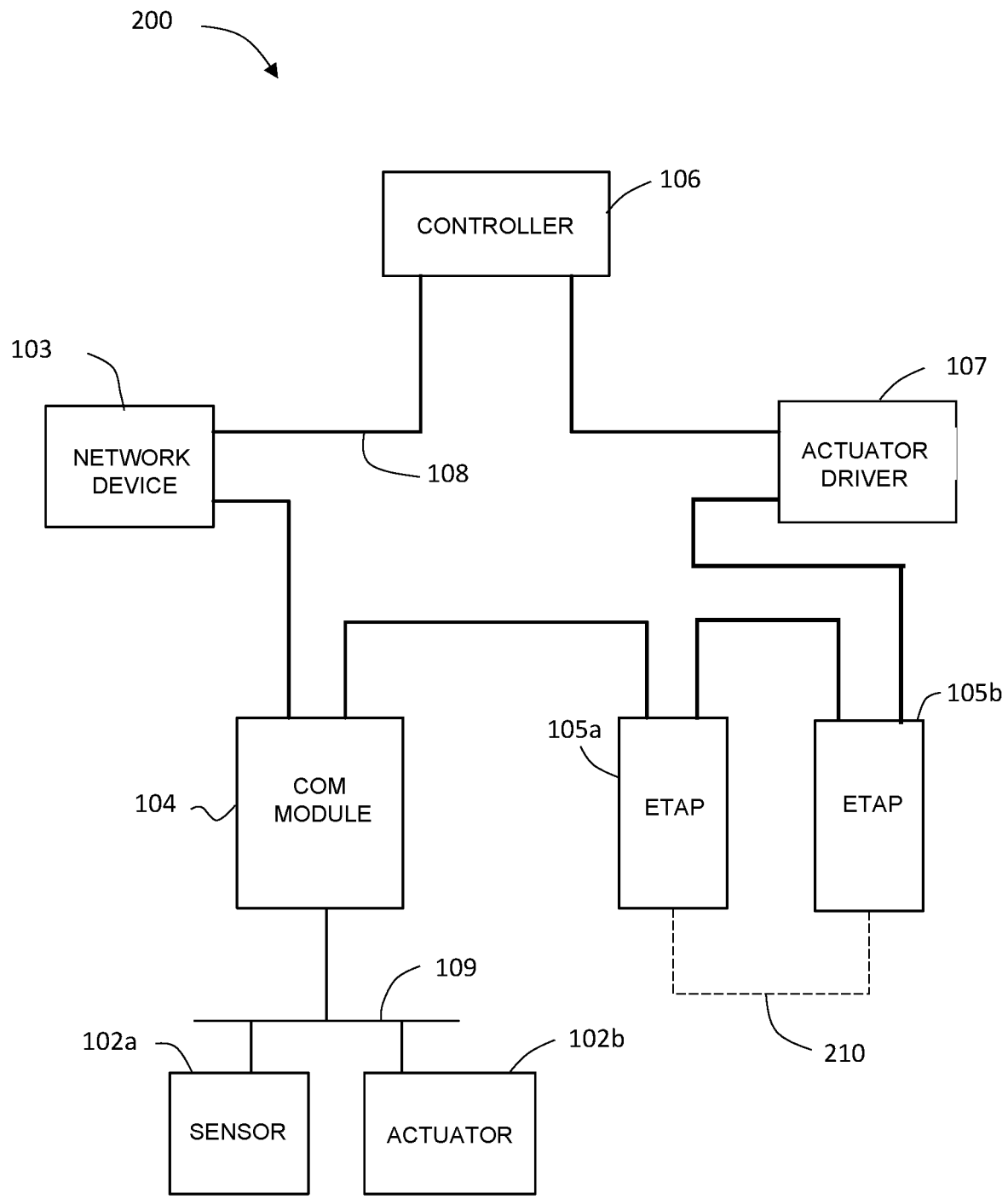
FIG. 2 illustrates an example device level ring topology node according to this disclosure.

FIG. 2 illustrates an example device level node 200 consisting of a controller 106 an I/O or communication (COM) module 104, Ethernet network devices 103 and 105a and 105b and actuator driver 107. The devices are arranged in a DLR topology using an Ethernet network 108 and communicating using a managed Ethernet protocol. For ease of explanation, the disclosure will be explained using the EtherNet/IP protocol, however, the network 108 may also use the Profinet protocol. Additionally, for ease of explanation, the device node 200 is described as being used in the automation system 100 of FIG. 1. However, the device node 200 could be used in any other suitable system. The example, node 200 operates at Level 1 of the Purdue model, and among other things, the example device node 200 may use the measurements from the one or more sensors 102a to control the operation of one or more actuators 102b.

As shown in FIG. 2, the device node 200 controller 106 may represent, or be represented by, various ones of the controllers 106 of FIG. 1. Controller 106 would act as the ring supervisor for the device node 200 providing communication with the module 104 and implementing control logic for controlling the actuator driver 107 within the device node 200. The device node 200 may also include Ethernet switch devices 103 for providing RJ45 cable ports to interconnecting the devices of the device node 200. The device node 200 may further include Ethernet tap (ETAP) devices 105a and 105b for converting RJ45 cabling to fiberoptic cabling for single port devices that require optical fiber connections. Controller 106 may also be connected to one or more I/O or COM modules 104 that may be connected to a separate device specific bus 109, operating using for example a ControlNet, DeviceNet or a Profibus communication protocol. Bus 109 providing device level communication between one or more sensors 102a and actuators 102b connected to COM module 104.

Figure 3:
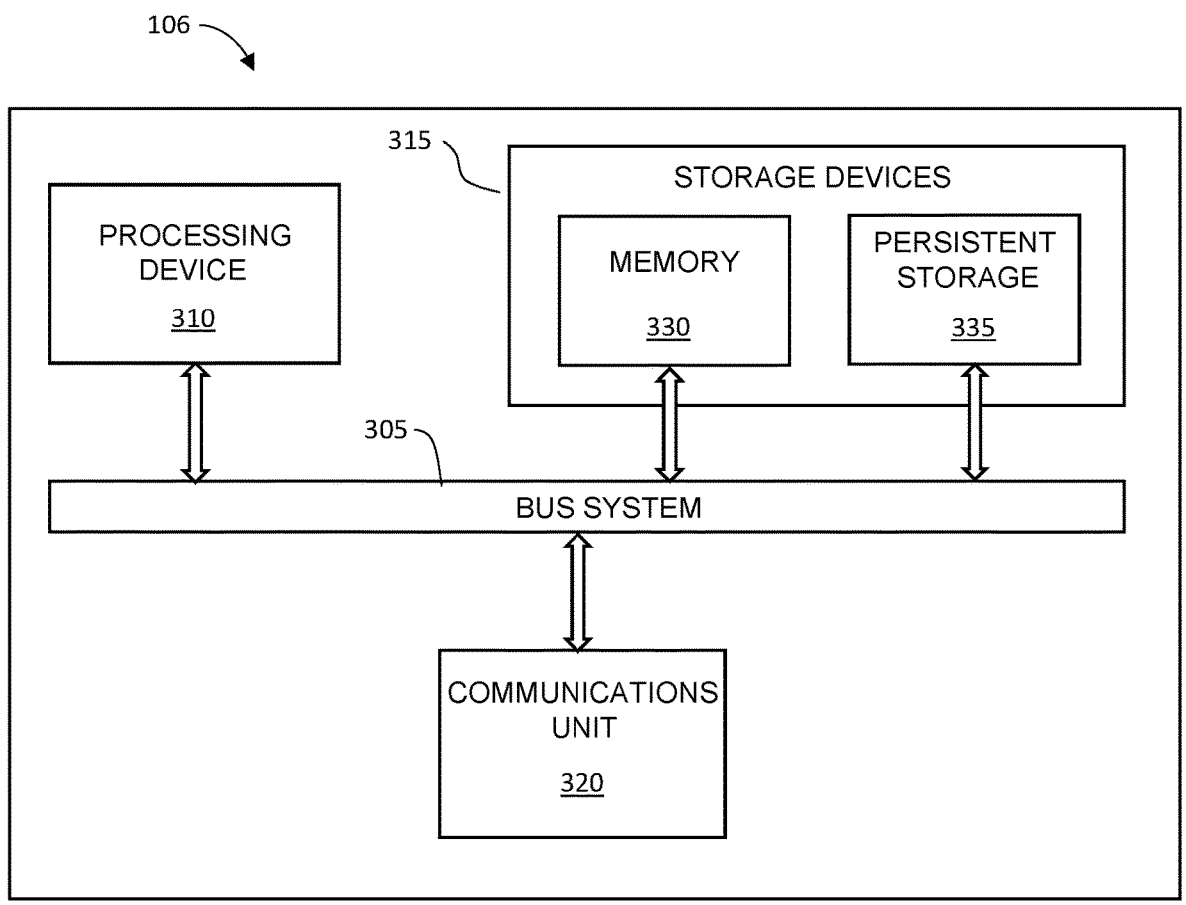
FIG. 3 illustrates an example controller according to this disclosure

FIG. 3 illustrates an example of a controller 106 according to this disclosure. As shown in FIG. 3, the controller 106 includes a bus system 305, which supports communication between at least one processing device 310, at least one storage device 315, at least one communications unit 320 and at least one input/output (I/O) unit 325.

The processing device 310 executes instructions that may be loaded into a memory 330. The processing device 310 may include any suitable number(s) and type(s) of processors or other devices in any suitable arrangement. Example types of processing devices 310 include microprocessors, microcontrollers, digital signal processors, field programmable gate arrays, application specific integrated circuits, and discreet circuitry.

The memory 330 and a persistent storage 335 are examples of storage devices 315, which represent any structure(s) capable of storing and facilitating retrieval of information (such as data, program code, and/or other suitable information on a temporary or permanent basis). The memory 330 may represent a random access memory or any other suitable volatile or non-volatile storage device(s). The persistent storage 335 may contain one or more components or devices supporting longer-term storage of data, such as a ready only memory, hard drive, Flash memory, or optical disc.

The communications unit 320 supports communications with other systems or devices. For example, the communications unit 320 could include a network interface card for communication over the Ethernet network 108 or a wireless transceiver facilitating communications over a wireless network (not shown). The communications unit 320 may support communications through any suitable physical or wireless communication link(s).

This disclosure will use the DLR topology shown in FIG. 2 to explain the fault detection tool and method of the present disclosure. It will be appreciated by those skilled in the art that the fault detection tool and method of the present disclosure can also be used in a STAR, LINEAR/STAR, or any hybrid combination of LINEAR, STAR or DLR topologies.

A managed Ethernet network using DLR Ring and Star network topologies, requires a large amount of cable interconnections between the various devices connected in the device node. A miswired connection between the devices can lead to network component malfunctions, device failures and controller failures during commissioning of the device node or during routine operation of the automation system. Moreover, in a DLR based network, misconnected wiring can lead to the creation of unwanted local loops, connector/extender shorting, etc. Misconnected wiring and unwanted local loops may cause network flooding and broadcast storms that eventually leads to the instability of the device node, CPU starvation, component failures and failures in the control of the devices in the DLR.

The present disclosure uses a fault detection tool implemented in the controller 106 and executed by processing device 310 to diagnose network instabilities in the device node 200. The fault detection tool of the present disclosure provides a diagnosis of a network issue in the device node 200 and generates alarms and network notifications to a user or plant operator at an operator station 112.

The fault detection tool can diagnose faulty local loops and wiring in the device node 200 due to misconnections. For example, in the device node 200 illustrated in FIG. 2, ETAP device 105a shows a miswired connection to another ETAP device 105b using an Ethernet cable 210 illustrated in broken line. The miswiring of a STAR network topology between devices 105a and 105b sets-up a local switching loop in the device node 200 that may lead to network problems such as for example, network flooding and broadcast storms that overwhelm the node with continuous multicast or broadcast traffic. The broadcast storm causes the network devices connected to the device node to rebroadcast the data on the Ethernet network eventually causing failure of the network. The fault detection tool can also monitor and diagnose partial network issues/glitches of a newly deployed DLR topology due to for example, faulty network switch devices. Further, the fault detection tool can diagnose momentary network issues due to power loss and single and multiple device communication failures due to CPU loading and communication resource constraints.

The fault detection tool is arranged to detect the root cause of a network failure in the device node 200 and provide a user or plant operator with the suspected faults found in the node. A user or plant operator may use the insights provided by the fault detection tool and take appropriate actions to resolve the network issue and avoid loss of productivity.

Figure 4:
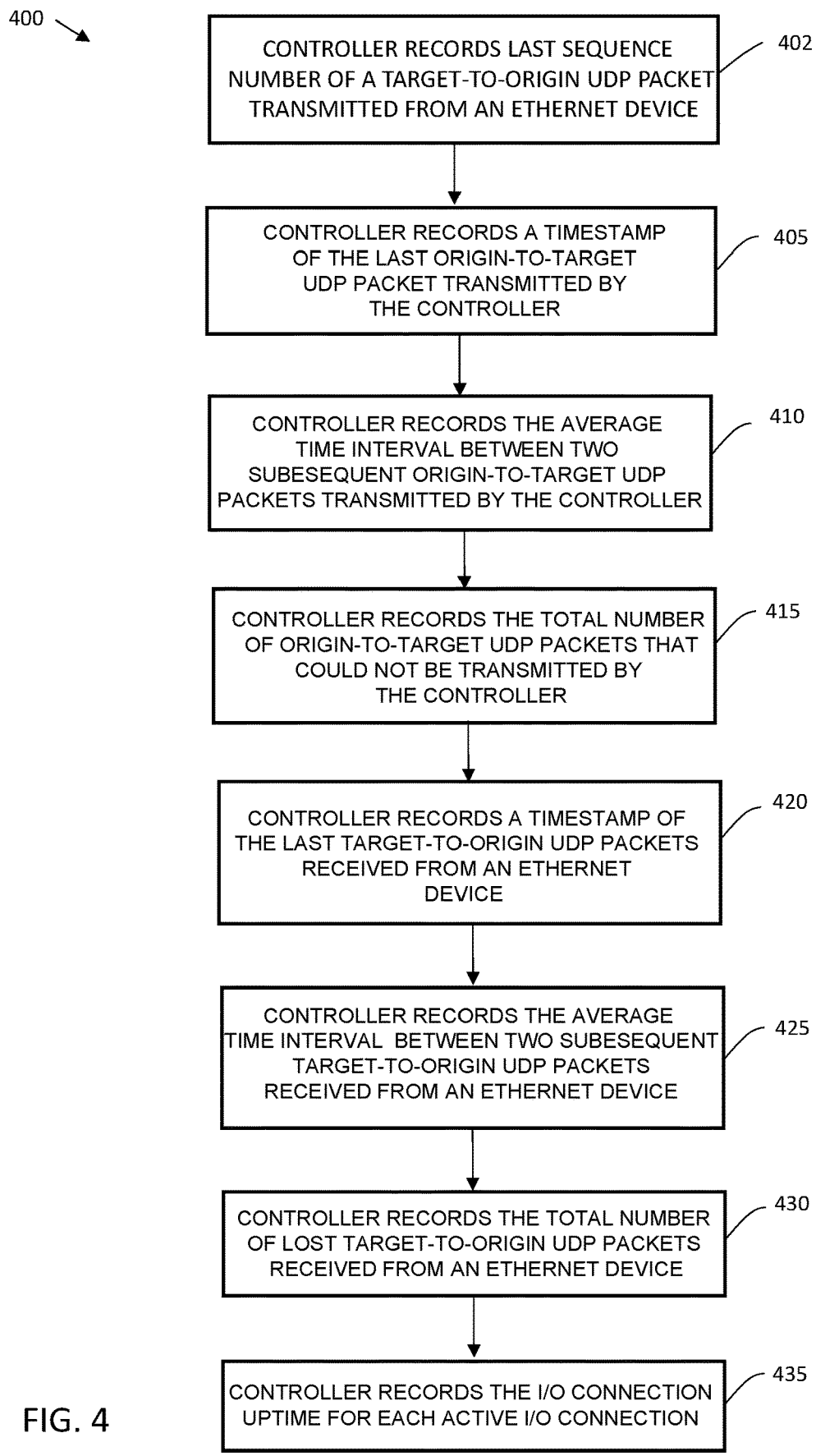
FIG. 4 illustrates an example communication data recording method to identify, device communication failures in communication networks according to this disclosure.
Figure 5:
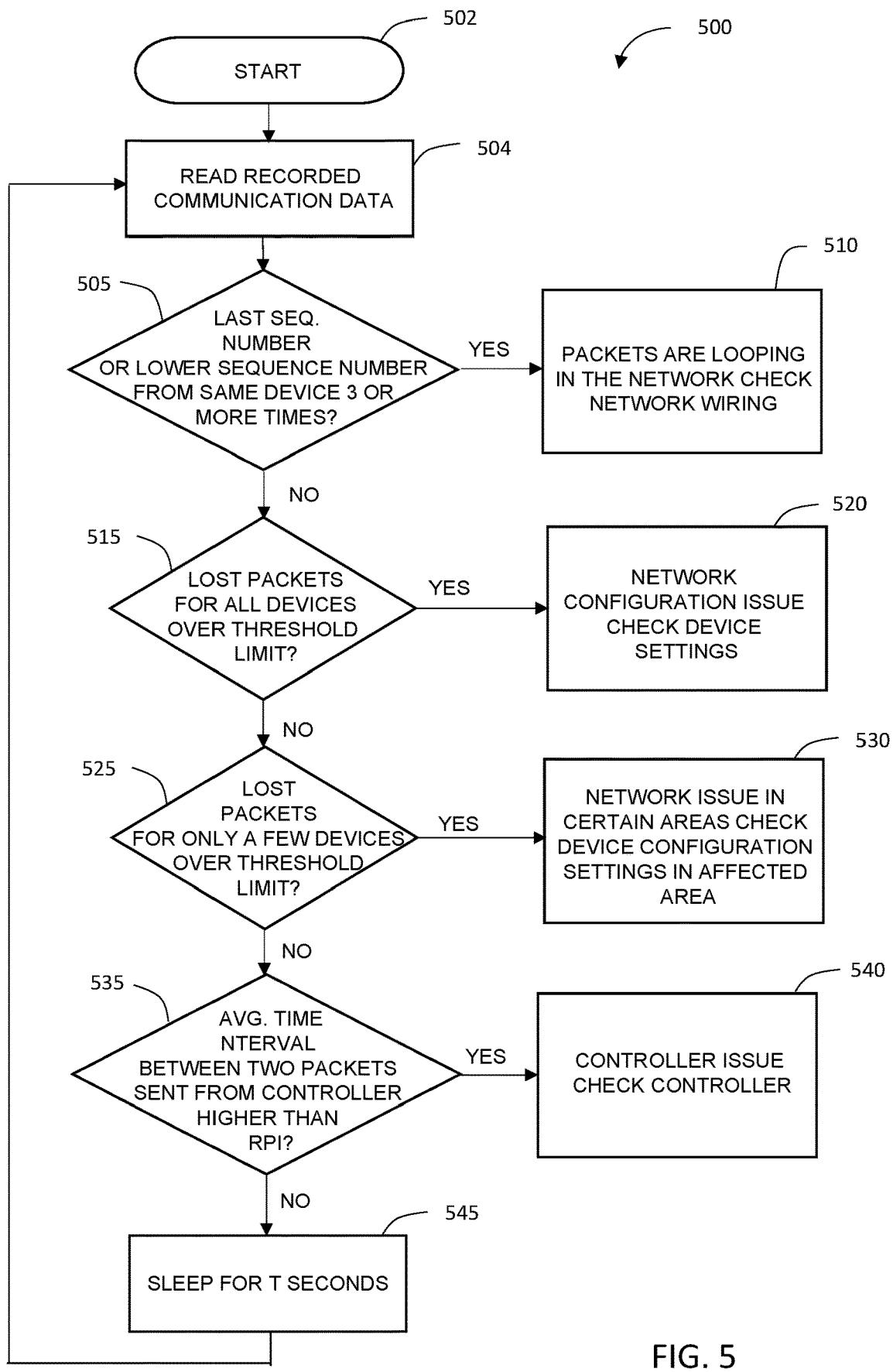
FIG. 5 illustrates an example method used to analyze device communication failures in communication networks according to this disclosure.

The fault detection tool comprises a communication data recording method 400 shown in FIG. 4 and a diagnostic method 500 shown in FIG. 5. FIG. 4 illustrates the example communication data recording method 400 used in gauging the health of the Ethernet network 108 according to this disclosure. For ease of explanation, the method 400 is described with respect to the process facility system 100 shown in FIG. 1. In particular, the method 400 is described as being performed by the controller 106. However, the method 400 could be used in any suitable system and performed by any suitable device(s) or component(s).

In operation the controller 106 records certain communication related data of the Ethernet datagram protocol (UDP) packets transmitted from the controller 106 to each device on the device node 200. Additionally, the controller 106 records certain communication related data of the UDP packets received by the controller from each device connected on the device node 200. The communication related data is continuously recorded and stored in memory 330 of controller 106. The recorded communication data is continuously being updated and recorded to memory 330.

Each device connected to the network 108 of device node 200 periodically sends UDP packets to the other devices connected in the network. A UDP packet consists of the source and destination ports being used in the communication, the packet length, and a checksum. The origin device adding its own header information to the UDP packet. The UDP packets are then broadcast on the network 200 between an origin network device and a network target device.

In operation 402 the controller 106 records the last sequence number (LASTSEQNUM) of target-to-origin UDP packets received from each device connected on the device node 200 broadcast on the node. Receiving the same LASTSEQNUM or a lower LASTSEQNUM is indicative of the data packets local looping in the node.

In operation 405 the controller 106 records a timestamp of the last origin-to-target UDP packet transmitted by controller 106 to each device on the device node 200.

In operation 410 the controller 106 records the average time interval between two subsequent origin-to-target UDP packets sent from controller 106 to a device. When a new device is connected to the device node 200, an origin-to-target data packet is sent by the Ethernet/IP network stack to the operating system TCP/IP stack. If the data packet is successfully sent, a timestamp of when the origin-to-target for the new device data packet is recorded and used to calculate a running average time duration between two subsequent origin-to-target data packets sent by the controller 106 to the new device. If the origin-to-target data packet cannot be added to the to the TCP/IP stack a counter that tracks the number of lost packets is updated for the new device connection.

In operation 415 the controller 106 records the total origin-to-target UDP packets that could not be sent by the controller to a device in the device node 200. The sequence number in the target-to-origin data packet is used to determine if any packets have been lost.

In operation 420 the controller 106 records a timestamp of the last target-to-origin UDP packets received by the controller from each EtherNet/IP device connected to device node 200.

In operation 425 the controller records the average time interval between two subsequent target-origin UDP packets from each device connected to the device node 200. When the controller 106 receives a new device target-to origin data packet from a device connected to device node 200, a timestamp of the event is used to calculate the running average time duration between two subsequent such events.

In operation 430 the controller 106 records the number of lost target-to-origin UDP packets from each Ethernet device connected to the device node 200. If the controller detects that any sequence numbers are missing, a counter that tracks the number of lost packets is updated for the device having the lost UDP packets.

In operation 435 the controller records the device connection uptime for each active device connection in the device node 200. When a new device is connected to the control network 200 a timestamp for the connection is stored which is used to calculate the uptime for the device.

FIG. 5 illustrates an example diagnostic method 500 for assessing the network and device health of the device node 200. The diagnostic method 500 is described with respect to the process facility system 100 shown in FIG. 1. In particular, the method 500 is described as being performed by the controller 106. However, the method 500 could be used in any suitable system and performed by any suitable device(s) or component(s).

The controller 106 will run diagnostic method 500 periodically to analyze the health of the managed Ethernet network 108 and the Ethernet devices connected to Ethernet network 108, such as for example, COM module 104, network device 103, ETAP devices 105a and 105b and actuator driver 107. The diagnostic method 500 uses the communication data recorded by controller 106 in the communication data recording method 400 to establish if data packets sent and received by the Ethernet devices are local looping or have been lost. Upon the discovery of local looping or lost data packets over an established threshold sent and received between the devices of network 108, the method generates network alarms and notification to a user or plant operator at an operator station, such as for example, operator station 112 notifying the user of the unexpected behavior of the network 108. The diagnostic method 500 further providing information to the user of the potential cause of a device malfunction as well as potential location of the problem within the network 108. The user can then use the information and insights provided by diagnostic method 500 to investigate and troubleshoot the problem.

In operation 502 the diagnostic method 500 is initiated by the processing device 310 of controller 106. The diagnostic method 500 can be run periodically on a schedule, such as timed to operate at certain timed intervals, or on-demand by the user. In operation 504 the diagnostic method 500 retrieves the recorded data stored in memory 330 of controller 106 and looks for network instabilities in the Ethernet network 108 or the Ethernet devices connected to network 108.

In operation 505 the diagnostic method analyzes the LASTSEQNUM of every data packet received from each device connected to the device node 200. If a target-to-origin UDP packet from the same device recorded by operation 402 of the communication data recording method 400 has a LASTSEQNUM or a lower LASTSEQNUM for 3 or more times the method determines that the data packets broadcast on the Ethernet network 108 are local looping. Then the method at operation 510 generates and sends network alarms and notification to a user or plant operator at an operator station, such as for example, operator station 112 notifying the user of network mis-wiring causing local looping that may lead to a network storm. If the data sequence number listing is normal than the method moves to operation 515.

In operation 515 the diagnostic method analyzes the recorded data and looks to see if all the devices in the network 108 have experiences lost data packets over a set threshold. If all the devices on network 108 have experiences lost packets the method at operation 520 sends notification to the user warning the user of a potential network configuration issue. The method may provide troubleshooting guides to the user to take specific actions such as, for example, to check the duplex and speed settings of all devices/switches 103, and switch configurations used in network 108.

If not all the devices in the network 108 have experienced lost data packets than the method continues to operation 525. In operation 525 the diagnostic method reads and analyses the recorded data and looks to see if only a few devices in the network 108 have experiences lost data packets over a set threshold. If total lost data packets for only few devices are above a threshold limit, then only part of the network 108 is unstable. The system notifies the user in operation 530 of network issues in the unstable area or the devices connected to the unstable area of the network 108. For example, if lost data packets exceed a threshold from the DLR ring connecting ETAP device 105 and actuator driver 107 than the diagnostic method 500 identifies that location and its connected devices as potentially having a network problem. The diagnostic method 500 may provide troubleshooting guides to the user to take specific actions such as for example to check for any network configuration issues, wiring misconnections in ethernet switches, electro-magnetic interferences, etc., at the location.

If lost data packets between the devices in network 108 do not exceed the threshold for all devices or, for a few devices, then the diagnostic method continues to operation 535. In operation 535, the diagnostic method 500 calculates the average time interval between two subsequent origin-to-target data packets sent from the controller 106. If the average time interval is at least 20% higher than the request packet interval (RPI) for all devices connected to network 108, then the method 500 branches to operation 540 warning the user that the controller 106 is having a communication issue and that the controller is not sending the data packets as expected. The diagnostic method 500 may provide troubleshooting guides to the user to take specific actions such for example, testing and inspecting the operation of the controller for overloading of controller's processing device, communication resources, etc.

If the average time interval sent between two packets by the controller 106 is below the RPI then the diagnostic method 500 continues to operation 545. In operation 545 the diagnostic method 500 goes to sleep for a period of time and then awakens to branch back to operation 504 to read the recorded communication data and run through the diagnostic operations of diagnostic method 500 again.

It may be advantageous to set forth definitions of certain words and phrases used throughout this patent document.

The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a communication network operably connecting one or more devices;
   a memory; and
   one or more processing devices operably connected to the memory and the communication network, the one or more processing devices configured to:
   collect communication data transmitted and received on the communication network from the one more devices and record the communication data in the memory wherein the communication data is comprised of data packets; and
   analyze the collected communication data stored in the memory to diagnose if the data packets have been looping during transmission between the one or more devices, wherein the analyzing comprises:
   record to the memory the sequence number of a data packet transmitted by each of the one or more devices;
   record to the memory a timestamp of the data packet transmitted by each of the one or more devices;
   record to the memory an average time interval between the data packet and a subsequent data packet transmitted by each of the one or more devices;

record to the memory the total number of data packets that could not be transmitted by each of the one or more devices;
determine whether a sequence number of the data packet and a sequence number of a subsequent data packet are the same sequence number of the sequence number of the subsequent data packet is lower than the sequence number of the data packet;
send a notification to the operator station based on the determination that the sequence number of the data packet is the same as the sequence number of the subsequent data packet or when the last sequence number or the sequence number of the subsequent data packet is lower than the sequence number of the data packet; and
provide information in the notification that the network is miswired causing local looping in the communication network.

2. The apparatus of claim 1, wherein to collect communication data includes recording the data packets transmitted by a controller, wherein a controller is configured to:
record to the memory a timestamp of the last data packet transmitted by the controller to the one or more devices;
record to the memory the average time interval between two subsequent data packets transmitted by the controller to the one or more devices; and
record to the memory a total number of data packets that could not be transmitted by the controller to the one or more devices.

3. The apparatus of claim 2, wherein to collect communication data further includes the controller recording to the memory a connection uptime for each of the one or more devices.

4. The apparatus of claim 1, wherein to analyze the collected communication data the controller is configured to:
read the recorded communication data in the memory;
analyze the recorded communication data to detect if all the one or more devices have experiences lost data packets;
send notifications to the operator station when an of lost data packets for all of the one or more devices exceed a threshold; and
provide information in the notification of a communication network configuration issue.

5. The apparatus of claim 4, wherein to analyze the collected communication data the controller is configured to:
read the recorded communication data in the memory;
analyze the recorded communication data to detect if only a certain few of the one or more devices have lost data packets;
send a notification to the operator station when the amount of lost data packets of the certain few of the one or more devices exceed a threshold; and
provide information in the notification that the certain few devices have network configuration issues.

6. The apparatus of claim 5, wherein to analyze the collected communication data the controller is further configured to:
read the recorded communication data in the memory;
analyze the recorded communication data to detect the time interval between two subsequent data packets sent from the controller;
send a notification to the operator station when the time interval is higher than a request packet interval for all the one or more devices; and provide information in the notification that the controller is having a communication issue.

7. A method comprising:
collecting communication data from data packets transmitted and received on a communication network from a controller and one or more devices operably connected to the communication network; and
analyzing the collected communication data to diagnose if the data packets have been looping during transmission between the controller and the one or more devices, wherein the collecting of communication data from data packets comprises:
recording a last sequence number of a data packet transmitted by each of the one or more devices;
recording a timestamp of the last data packet transmitted by the controller to the one or more devices;
recording an average time interval between two subsequent data packets transmitted by each of the one or more devices;
recording a total number of data packets that could not be transmitted by each of the one or more devices;
wherein analyzing the collected communication data comprises:
reading the recorded communication data;
analyzing the recorded communication data to detect if the same last sequence number or a lower sequence number for a data packet are being sent by the devices;
sending a notification when the last sequence number or a lower sequence number for a data packet has been the same for three or more data packets; and
providing information in the notification that the network is miswired causing local looping in the communication network.

8. The method of claim 7, wherein to analyze the collected communication data further comprises:
reading the recorded communication data;
analyzing the recorded communication data to detect if all the one or more devices connected to the device node have experiences lost data packets;
sending a notification when an amount of lost data packets for all of the one or more devices exceeds a threshold; and
providing information in the notification of a configuration issue with the communication network.

9. The method of claim 7, wherein to analyze the collected communication data further comprises:
reading the recorded communication data;
analyzing the recorded communication data to detect if only a certain few of the one or more devices connected to the communication network have experiences lost data packets;
sending a notification when an amount of lost data packets for a certain few of the one or more devices exceed a threshold; and
providing information in the notification that the certain few devices have network configuration issues.

10. The method of claim 7, wherein to analyze the collected communication data further comprises:
reading the recorded communication data;
analyzing the recorded communication data to detect the time interval between two subsequent data packets sent from the controller;
sending a notification when the time interval is higher than a request packet interval for all the one or more devices; and providing information in the notification that the controller is having a communication issue.

11. A non-transitory machine-readable medium encoded with executable instructions that, when executed cause one or more processors to:
collect communication data from data packets transmitted and received on a communication network from a controller and one or more devices operably connected to the communication network; and
analyze the collected communication data to diagnose if the data packets have been looping during transmission between the controller and the one or more devices,
wherein the collection of communication data from data packets comprises:
recording a last sequence number of the data packet transmitted by each of the one or more devices;
recording a timestamp of the last data packet transmitted by the controller to the one or more devices;
recording the average time interval between two subsequent data packets transmitted by the controller to the one or more devices;
recording the total number of data packets that could not be transmitted by the controller to the one or more devices;
recording a timestamp of the last data packet transmitted by each of the one or more devices;
recording the average time interval between two subsequent data packets transmitted by each of the one or more devices;
recording the total number of data packets that could not be transmitted by each of the one or more devices,
wherein analyzing the communication data comprises:
reading the recorded communication data;
analyzing the recorded communication data to detect the time interval between two subsequent data packets sent from the controller;
sending a notification when the time interval is higher than a request packet interval for all the one or more devices; and
providing information in the notification that the controller is having a communication issue.

12. The non-transitory machine readable medium of claim 11, wherein to analyze the collected communication data further comprises:
reading the recorded communication data;
analyzing the recorded communication data to detect if the same last sequence number or a lower sequence number for a data packet are being sent by the devices;
sending a notification when the last sequence number or a lower sequence number for a data packet has been the same for three or more data packets;
providing information in the notification that the network is miswired causing local looping in the communication network;
analyzing the recorded communication data to detect if all the one or more devices have experiences lost data packets;
sending a notification when an amount of lost data packets for all of the one or more devices exceeds a threshold;
providing information in the notification of a configuration issue with the communication network;
analyzing the recorded communication data to detect if only a certain few of the one or more devices connected to the communication network have experiences lost data packets;
sending a notification when the amount of lost data packets for a certain few of the one or more devices exceed a threshold; and
providing information in the notification that the certain few devices have network configuration issues.

* * * * *